(12) United States Patent
Burazin et al.

(10) Patent No.: US 11,401,658 B2
(45) Date of Patent: *Aug. 2, 2022

(54) LAMINATED PAPERMAKING BELT (71) Applicant: Kimberly-Clark Worldwide, Inc., Neenah, WI (US)

(72) Inventors: Mark Alan Burazin, Oshkosh, WI (US); Geoffrey Fenn Carlow, Neenah, WI (US); Richard Alan Zanon, Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/751,701

(22) Filed: Jan. 24, 2020

(65) Prior Publication Data
US 2020/0157740 A1    May 21, 2020

Related U.S. Application Data

(63) Continuation of application No. 16/317,671, filed as application No. PCT/US2018/044656 on Jul. 31, 2018, now Pat. No. 10,584,444.

(Continued)

(51) Int. Cl.
*D21F 7/08* (2006.01)
*D21F 1/00* (2006.01)
(Continued)

(52) U.S. Cl.
CPC .............. *D21F 7/083* (2013.01); *B32B 3/266* (2013.01); *B32B 3/30* (2013.01); *B32B 5/022* (2013.01);
(Continued)

(58) Field of Classification Search
CPC .... D21F 1/0027; D21F 1/0036; D21F 1/0063; D21F 1/105; D21F 7/08; D21F 7/083;
(Continued)

(56) References Cited

U.S. PATENT DOCUMENTS 3,322,617 A * 5/1967 Osborne ............ B01D 39/1607
162/296
3,858,623 A * 1/1975 Lefkowitz ............. D21F 1/0027
139/425 A
(Continued)

FOREIGN PATENT DOCUMENTS

CN         1153544 A      7/1997
CN       203270377 U     11/2013
(Continued)

OTHER PUBLICATIONS

Vaugh, E.A., "Nonwoven Processes and Products Applicable to Cotton and Other Cellulosic Fibers", School of Textiles, Fiber and Polymer Science, Clemson University, Clemson, SC, vol. 2:1334-1337 (1999).
(Continued)

*Primary Examiner* — Eric Hug
(74) *Attorney, Agent, or Firm* — Kimberly-Clark Worldwide, Inc.

(57) ABSTRACT

Disclosed is a two layered belt useful in the manufacture of tissue products comprising a first woven layer and a second nonwoven layer joined together in a laminated arrangement. The woven layer typically forms the machine contacting layer of the belt and is woven from a highly abrasion resistant material, while the nonwoven layer contacts the nascent tissue web. The woven layer may be provided with valleys and ridges that the nascent web is molded into, while the nonwoven layer may be provided with elements that impart a visually aesthetic pattern to the web. In this manner the belt may be useful in the production of products having (Continued)

desirable physical properties resulting from molding into the woven fabric while also being visually pleasing to the user.

15 Claims, 6 Drawing Sheets

Related U.S. Application Data (60) Provisional application No. 62/538,846, filed on Jul. 31, 2017.

(51) Int. Cl.
*B32B 3/26* (2006.01)
*B32B 3/30* (2006.01)
*B32B 5/02* (2006.01)
*B32B 5/26* (2006.01)
*B65G 15/42* (2006.01)
*D21F 7/12* (2006.01)
*D21F 11/00* (2006.01)
*D21F 11/14* (2006.01)
*D21H 27/02* (2006.01)
*D21H 27/00* (2006.01)

(52) U.S. Cl.
CPC .............. *B32B 5/024* (2013.01); *B32B 5/26* (2013.01); *B65G 15/42* (2013.01); *D21F 1/0036* (2013.01); *D21F 7/12* (2013.01); *D21F 11/006* (2013.01); *B32B 2433/02* (2013.01); *D21F 11/145* (2013.01); *D21H 27/002* (2013.01); *D21H 27/02* (2013.01)

(58) Field of Classification Search
CPC ........ D21F 7/12; D21F 11/006; D21F 11/008; D21F 11/14; D21F 11/145
USPC ................................ 162/116, 296, 348, 362
See application file for complete search history.

(56) References Cited

U.S. PATENT DOCUMENTS

| | | | |
|---|---|---|---|
| 4,514,345 A | 4/1985 | Johnson et al. | |
| 4,541,895 A | 9/1985 | Albert | |
| 4,579,771 A | 4/1986 | Finn et al. | |
| 5,077,116 A * | 12/1991 | Lefkowitz | D21F 7/083 |
| | | | 428/141 |
| 5,429,686 A | 7/1995 | Chiu et al. | |
| 5,431,786 A | 7/1995 | Rasch et al. | |
| 5,575,874 A | 11/1996 | Griesbach et al. | |
| 5,607,551 A | 3/1997 | Farrington et al. | |
| 5,629,052 A | 5/1997 | Trokhan et al. | |
| 5,672,248 A | 9/1997 | Wendt et al. | |
| 5,935,381 A | 8/1999 | Trokhan et al. | |
| 6,350,336 B1 † | 2/2002 | Paquin | |
| 6,408,753 B1 | 6/2002 | Finn et al. | |
| 6,576,091 B1 | 6/2003 | Cabell et al. | |
| 6,827,821 B2 | 12/2004 | Brewster et al. | |
| 6,991,706 B2 | 1/2006 | Lindsay et al. | |
| 7,014,735 B2 | 3/2006 | Kramer et al. | |
| 7,297,233 B2 * | 11/2007 | Herman | D21F 1/0036 |
| | | | 162/358.1 |
| 7,682,995 B2 | 3/2010 | Stone et al. | |
| 7,799,382 B2 | 9/2010 | Payne et al. | |
| 7,914,649 B2 | 3/2011 | Ostendorf et al. | |
| 8,293,072 B2 | 10/2012 | Super et al. | |
| 8,460,756 B2 | 6/2013 | Jeffery et al. | |
| 8,822,009 B2 | 9/2014 | Riviere et al. | |
| 8,920,905 B2 | 12/2014 | Sauter et al. | |
| 9,873,980 B2 | 1/2018 | Eagles et al. | |
| 9,957,665 B2 | 5/2018 | Eagles et al. | |
| 2002/0139487 A1 | 10/2002 | Kerr | |
| 2005/0280184 A1 * | 12/2005 | Sayers | B29C 64/40 |
| | | | 264/308 |
| 2006/0219313 A1 | 10/2006 | Gstrein et al. | |
| 2007/0155269 A1 | 7/2007 | Patel et al. | |
| 2008/0023165 A1 | 1/2008 | Herman et al. | |
| 2008/0110591 A1 * | 5/2008 | Mullally | D21F 11/006 |
| | | | 162/358.2 |
| 2011/0272112 A1 | 11/2011 | Aberg et al. | |
| 2015/0176221 A1 | 6/2015 | Maladen et al. | |
| 2016/0090692 A1 † | 3/2016 | Eagles | |
| 2016/0159007 A1 | 6/2016 | Miller, IV et al. | |
| 2016/0229653 A1 | 8/2016 | Shoji et al. | |
| 2017/0233946 A1 | 8/2017 | Sealey et al. | |
| 2018/0105984 A1 | 4/2018 | Eagles et al. | |
| 2018/0119347 A1 | 5/2018 | Brent, Jr. et al. | |
| 2018/0119348 A1 | 5/2018 | Brent, Jr. et al. | |
| 2018/0119350 A1 | 5/2018 | Brent, Jr. et al. | |
| 2018/0119351 A1 | 5/2018 | Brent, Jr. et al. | |
| 2018/0119354 A1 | 5/2018 | Brent, Jr. et al. | |

FOREIGN PATENT DOCUMENTS

| | | |
|---|---|---|
| JP | 2803993 B2 | 9/1998 |
| JP | 2008045238 A | 2/2008 |
| KR | 20140087848 A | 7/2014 |
| WO | 16022880 A1 | 2/2016 |

OTHER PUBLICATIONS

Ouederni, Mabrouk, "Chapter 9 Polyolefins in Textiles and Nonwovens", Springer International Publishing Switzerland, 2016.
Third Party Observation.
Plantikow, James E., "Forming Fabric Design Technology Continues to Evolve at Rapid Pace", Pulp & Paper, Oct. 1984.
Petition for Post Grant Review of U.S. Pat. No. 10,584,444.
Exhibit 1001 to Petition for Post Grant Review of U.S. Pat. No. 10,584,444.
Exhibit 1002 to Petition for Post Grant Review of U.S. Pat. No. 10,584,444.
Exhibit 1003 to Petition for Post Grant Review of U.S. Pat. No. 10,584,444.
Exhibit 1004 to Petition for Post Grant Review of U.S. Pat. No. 10,584,444.
Exhibit 1005 to Petition for Post Grant Review of U.S. Pat. No. 10,584,444.
Exhibit 1006 to Petition for Post Grant Review of U.S. Pat. No. 10,584,444.
Exhibit 1007 to Petition for Post Grant Review of U.S. Pat. No. 10,584,444.
Exhibit 1008 to Petition for Post Grant Review of U.S. Pat. No. 10,584,444.
Exhibit 1009 to Petition for Post Grant Review of U.S. Pat. No. 10,584,444.
Exhibit 1010 to Petition for Post Grant Review of U.S. Pat. No. 10,584,444.
Exhibit 1011 to Petition for Post Grant Review of U.S. Pat. No. 10,584,444.
Exhibit 1012 to Petition for Post Grant Review of U.S. Pat. No. 10,584,444.
Exhibit 1013 (Part 1) to Petition for Post Grant Review of U.S. Pat. No. 10,584,444.
Exhibit 1013 (Part 2) to Petition for Post Grant Review of U.S. Pat. No. 10,584,444.
Exhibit 1014 to Petition for Post Grant Review of U.S. Pat. No. 10,584,444.
Exhibit 1015 to Petition for Post Grant Review of U.S. Pat. No. 10,584,444.
Exhibit 1016 to Petition for Post Grant Review of U.S. Pat. No. 10,584,444.
Exhibit 1017 to Petition for Post Grant Review of U.S. Pat. No. 10,584,444.
Exhibit 1018 to Petition for Post Grant Review of U.S. Pat. No. 10,584,444.
Exhibit 1019 to Petition for Post Grant Review of U.S. Pat. No. 10,584,444.

(56) References Cited

OTHER PUBLICATIONS

Exhibit 1020 to Petition for Post Grant Review of U.S. Pat. No. 10,584,444.
Exhibit 1021 to Petition for Post Grant Review of U.S. Pat. No. 10,584,444.
Exhibit 1022 to Petition for Post Grant Review of U.S. Pat. No. 10,584,444.
Exhibit 1023 to Petition for Post Grant Review of U.S. Pat. No. 10,584,444.
Exhibit 1024 to Petition for Post Grant Review of U.S. Pat. No. 10,584,444.
Exhibit 1025 to Petition for Post Grant Review of U.S. Pat. No. 10,584,444.
Exhibit 1026 to Petition for Post Grant Review of U.S. Pat. No. 10,584,444.
E.A. Vaughn, "Nonwoven Processes and Products Applicable to Cotton and Other Cellulosic Fibers", pp. 1334-1337, 1999, Reprinted from the Proceedings of the Beltwide Cotton Conference, vol. 2.†
Mabrouk Ouederni, "Chapter 9 Polyolefins in Textiles and Nonwovens", Polyolefin Compounds and Materials, pp. 231-245, 2016, Copyright Springer International Publishing, Switzerland.†
James E. Plantikow, "Forming Fabric Design Technology Continues to Evolve at Rapid Pace", Albany International Felt and Fabric Facts, pp. 1-4, 1984, vol. 32, No. 2.†

\* cited by examiner
† cited by third party

LAMINATED PAPERMAKING BELT

RELATED APPLICATIONS

The present application is a continuation application and claims priority to U.S. patent application Ser. No. 16/317,671, filed on Jan. 14, 2019, which is a national-phase entry, under 35 U.S.C. § 371, of PCT Patent Application No. PCT/US18/44656, filed on Jul. 31, 2018, which claims benefit of U.S. Provisional Application No. 62/538,846, filed Jul. 31, 2017, all of which are incorporated herein by reference.

BACKGROUND

One type of belt used in the manufacture of fibrous webs convertible into tissue products, such as paper towels, facial tissues, toilet tissues, and napkins, are through-air drying belts. Through-air drying belts are often woven from yarns to provide a belt having a three dimensional surface topography and variable permeability. Examples of woven through-air drying belts are disclosed, for example, in U.S. Pat. Nos. 6,998,024 and 7,611,607. Such fabrics may be woven such that they have a textured sheet contacting surface comprising substantially continuous machine-direction ridges separated by valleys. The ridges may be formed of multiple warp strands grouped and stacked together to a height from 0.5 to about 3.5 millimeters. The stacked warp strands provide the sheet contacting surface with a three dimensional topography, which is desirable for molding and shaping the nascent tissue web but alter the permeability of the fabric such that there are regions of high permeability and low permeability. Further, the height of the ridges is limited by the conformability of the nascent web.

To overcome limitations of woven papermaking belts, tissue makers have developed composite belts having a framework joined to a fluid-permeable reinforcing layer such as, for example, a woven structure. The framework may be resinous, such as those disclosed in U.S. Pat. Nos. 4,637,859, 5,628,876 and 6,358,594, or they may be a silicone, or the like, such as that disclosed in U.S. Pat. No. 9,657,444. The advantage of such fabrics is that the frameworks may take any number of different patterns, and may be continuous, semi-continuous, comprise a plurality of discrete protuberances, or any combination thereof. Further, the framework, which is independent of the reinforcing layer and generally not constrained by the limitations of weaving technology, extends outwardly from the reinforcing layer and may define apertures that may receive and structure the nascent web as it is dried. While the framework may provide benefits over fabrics consisting essentially of woven yarns, such composite belts have limitations. For example, the prior art methods of manufacturing composite through-air drying fabrics generally result in the framework surrounding the underlying woven yarns, which reduces the permeability of the composite belt and may impede drying of the nascent web.

Accordingly, there remains a need in the art for a papermaking belt and more specifically a through-air drying belt useful in the manufacture of through-air dried tissue products that overcomes the limitations of prior art woven and composite belts. Specifically, there remains a need for a multi-layered belt that is capable of providing the nascent tissue with a wide range of patterns without negatively affecting the tissue making process and more specifically drying of the nascent tissue web.

SUMMARY

The present inventors have now discovered that a papermaking belt and more specifically a through-air drying belt useful in the manufacture of through-air dried tissue products that overcomes the limitations of prior art woven and composite belts may be manufactured by laminating a nonwoven layer and a woven layer. The resulting laminated papermaking belt comprises two layers where there is a void between the first and second layers which enables molding of the nascent web during manufacture. The voids are partially formed as a result of the woven layer having a three dimensional topography defined by yarns woven into ridges and valleys on top of which lies the nonwoven layer. Further, in a particularly preferred embodiment, in the laminating process the yarns forming the ridges and valleys, and particularly those forming the ridges, are not entirely enveloped by the nonwoven layer resulting in a void between the layers.

Accordingly, in one embodiment the present invention provides a laminated papermaking belt comprising a woven layer comprising a plurality of woven ridges lying in a first x-y plane and a plurality of woven valleys lying in a second x-y plane, wherein the first plane is above the second plane; and a nonwoven layer comprising a plurality of apertures; wherein the woven layer and nonwoven layers are laminated to one another in a facing arrangement and wherein there is a void between the woven and nonwoven layers, the void having a void height (D) from about 0.10 to about 2.80 mm.

In other embodiments the present invention provides a laminated papermaking belt having machine direction and a cross-machine direction, a machine contacting surface and an opposite web contacting surface, the belt comprising a multi-layer structure formed by at least a first non-woven layer and a second woven layer joined together in a face-to-face relationship, each of the at least first and second layers having a top surface, a bottom surface opposite to the top surface, the top surface of the first layer forming a portion of the web contacting surface of the belt, and the bottom surface of the second layer forming the machine contacting surface of the belt, wherein the woven layer comprises a plurality of woven ridges lying in a first x-y plane and a plurality of woven valleys lying in a second x-y plane below the first plane such that the nonwoven layer contacts at least a portion of the plurality of ridges and comprises a plurality of suspended portions elevated in the z-direction from the second x-y plane to form void spaces between the second x-y plane and the suspended portions.

In yet other embodiments the present invention provides a laminated papermaking belt comprising a plurality of woven yarns forming ridges lying in a first x-y plane valleys lying in a second x-y plane, wherein the first plane is above the second plane; and nonwoven layer consisting of a thermoplastic resin, a silicone rubber, or a fluoroelastomer, the nonwoven layer having a plurality of apertures and a percent open area greater than about 70 percent; wherein the woven yarns and the nonwoven layer are laminated to one another in a facing arrangement and wherein there is a void between the woven yarns and the nonwoven layer, the void having a void height (D) from about 0.10 to about 2.80 mm. In certain instances, the nonwoven layer comprises a continuous framework having a maximum element width from about 0.20 to about 2.0 mm. In other instances, the nonwoven layer comprises a continuous lattice grid having a substantially uniform width which ranges from about 0.20 to about 1.00 mm In still other embodiments the present invention provides a method of manufacturing a laminated papermaking belt comprising the steps of providing a woven support structure comprising a plurality of woven ridges lying in a first x-y plane and a plurality of woven valleys lying in a second x-y plane below the first plane; providing a first and a second process roll, the first and second process rolls being rotatable about their respective axes and the axes being parallel to one another; mounting the support structure around the first and second process rolls, the first and second process rolls thereby being within the endless loop of the base fabric; providing a pressure roll, the pressure roll forming a nip with the first process roll and pressing the support structure against the first process roll; rotating the first and second process rolls in a common direction; providing an apertured nonwoven sheet; heating the nonwoven sheet; and feeding the nonwoven sheet into the nip thereby attaching the nonwoven sheet to at least a portion of the plurality of support structure ridges.

DESCRIPTION OF THE DRAWINGS

FIG. 5A top plan view of a laminated papermaking belt according to another embodiment of the present invention;

FIG. 6A top plan view of a laminated papermaking belt according to yet another embodiment of the present invention;

DEFINITIONS

As used herein, the term "aperture" generally refers to an opening or a hole that extends entirely through one dimension of a material, such as a layer of a papermaking belt, and comprises an opening on a first surface, an opening on an opposing second surface and a channel joining the first and second openings. The openings may be the same or different dimensions. The channel joining the first and second openings may have a constant dimension throughout its length or may be variable. Apertures generally act as conduits for air and/or water through the material they are disposed on.

As used herein, the term "machine direction" (MD) generally refers to the direction parallel to the path of travel of the belt during the manufacturing process.

As used herein, the term "cross-machine direction" (CD) generally refers to a direction perpendicular to the machine direction.

As used herein, the term "z-direction" generally refers to a direction orthogonal to the machine and cross-machine direction.

As used herein, the term "papermaking belt" means any structure used for making a fibrous structure such as a tissue sheet, either by a wet-laid process or an air-laid process, which supports and transports the fibrous structure through one or more papermaking processes. Specific papermaking belts within the scope of this invention include forming fabrics; transfer fabrics conveying a wet web from one papermaking step to another, such as described in U.S. Pat. No. 5,672,248; as molding, shaping, or impression fabrics where the web is conformed to the structure through pressure assistance and conveyed to another process step, as described in U.S. Pat. No. 6,287,426; as creping fabrics as described in U.S. Pat. No. 7,815,768; as embossing fabrics as described in U.S. Pat. No. 4,849; as a structured fabric adjacent a wet web in a nip as described in U.S. Pat. No. 8,118,979; or as a through-air drying fabric as described in U.S. Pat. Nos. 5,429,686 and 6,808,599. The fabrics of the invention are also suitable for use as molding or air-laid forming fabrics used in the manufacture of non-woven, non-cellulosic webs such as baby wipes. While the inventive structures are typically referred to herein as a "belt" the terms fabric, conveyor, sleeve, and support member may be used interchangeably to describe the structures of the present invention.

As used herein, the term "support structure" generally refers to the first layer of the laminated papermaking belt of the present invention, the bottom surface of which is brought into contact with papermaking machinery during use. In particularly preferred embodiments the support structure is a woven fabric onto which one or more nonwoven layers are laminated.

As used herein, the term "woven" generally refers to structure formed from a plurality of interconnected filaments. Woven refers to structures comprising a plurality of filaments that have been interconnected by weaving two or more filament together, such as by interlacing in a repeating pattern, as well as structures made of a multiplicity of helical coils or links of filaments such as wire-link belts disclosed, for example, in U.S. Pat. No. 5,334,440.

As used herein, "warps" generally refers to machine-direction yarns and "shutes" generally refer to cross-machine direction yarns, although it is known that fabrics can be manufactured in one orientation and run on a paper machine in a different orientation.

As used herein, "warp dominant" when used in reference to the construction of a woven fabric generally refers to a fabric characterized by a top plane dominated by warp floats, or MD impression knuckles, passing over two or more shutes. There are no cross-machine direction knuckles in the top plane. Examples of warp dominant fabrics can be found in U.S. Pat. No. 5,746,887.

As used herein, "shute dominant" fabrics are characterized by a top plane dominated by shute floats, or CD impression knuckles, passing over two or more warps. There are no machine direction knuckles in the top plane.

As used herein, "coplanar" when used in reference to the construction of a woven fabric generally refers to a fabric characterized by a top plane containing both warp floats and shute floats which are substantially co-planar. For the purposes of this invention, co-planar fabrics are characterized by knuckle heights (hereinafter defined) above the intermediate plane (hereinafter defined) less than about 10 percent of the combined sum of average warp and shute diameters.

As used herein, "intermediate plane" when used in reference to a woven fabric generally refers to the plane formed by the highest points of the perpendicular yarn knuckles. For warp dominant fabrics, the intermediate plane is defined as the plane formed by the highest points of the shute knuckles. For shute dominant fabrics, the intermediate plane is defined as the plane formed by the highest points of the warp knuckles. There is no intermediate plane for co-planar structures.

As used herein, the term "valley bottom" when used in reference to a woven fabric generally refers to the top of the lowest visible yarn which a tissue web can contact when molding into the textured side of the fabric having machine-direction ridges separated by valleys. The valley bottom can be defined by a warp knuckle, a shute knuckle, or by both. The "valley bottom plane" is the z-direction plane intersecting the top of the elements comprising the valley bottom.

As used here, the term "void" generally refers to an empty space extending between the bottom surface plane of the nonwoven layer and a second surface plane of the woven layer. In certain preferred embodiments, the second surface plane of the woven layer may be coplanar with the valley bottom plane and the bottom surface plane of the nonwoven layer may be coplanar with the first surface plane of the woven layer.

DETAILED DESCRIPTION

The present invention generally relates to a laminated papermaking belt comprising a first woven layer and a second nonwoven layer joined together in a laminated arrangement to define a two layered belt. Each layer of the belt, also referred to herein as a fabric, is chosen to serve a particular purpose. For example, the woven layer, which may be brought in contact with machine parts during use, may be woven from a highly abrasion resistant material, while the nonwoven layer may be formed from a material that easily releases the fibrous structure after it's been formed on the nonwoven layer's surface. In other instances, the woven layer may be woven so as to provide valleys and ridges that the nascent web may be molded into to modify the structural properties of the resulting fibrous structure, while the nonwoven layer is provided with design elements that impart a visually aesthetic pattern to the fibrous structure. For other applications, it may be desirable for the individual layers to have apertures of varying size and then to laminate the layers together so as to create channels of varying sizes to alter the transportation of water and/or air through the fabric. These and other features of the instant laminated papermaking belt will be described in more detail below.

The papermaking belt of the present invention may be useful in a number of different papermaking applications, such as a forming fabric or drying fabric. For example, the instant belts are well suited for use as a through-air drying (TAD) fabric in the manufacture of through-air dried fibrous structures, and more particularly through-air dried tissue webs, such as the process disclosed in U.S. Pat. No. 5,672, 248. In some instances, the belts may be used as impression fabrics in wet pressed papermaking processes as disclosed in U.S. Pat. No. 6,287,426.

The laminated belts of the present invention generally comprise at least two layers, and may comprise more than two layers, such as three, four, five or six layers. Generally, the first layer is a support structure which functions, in-part, as a supporting substrate for the nascent tissue web. In this manner the support structure has a first web contacting surface, which is generally the upper surface of the structure, and an opposite bottom surface that is brought into contact with the papermaking machine and may be referred to herein as the machine contacting surface. The support structure may be constructed from any one or more of textile materials—which includes any woven supporting substrate such as woven yarns, yarn arrays, spiral links, knits, braids, spiral wound strips of any of the above-listed forms. The textile materials used to form the support structure may be any one of those well known in the art such as, for example, polymers, such as polyethylene terephthalate ("PET"), polyamide ("PA"), polyethylene ("PE"), polypropylene ("PP"), polyphenylene sulfide ("PPS"), polyether ether ketone ("PEEK"), or a combination thereof.

A second layer, which is generally a nonwoven polymeric layer, is joined to the support structure in a face-to-face relationship. The second layer, like the woven layer, has a top surface and a bottom surface opposite to the top surface. The second layer generally comprises a plurality of apertures extending in the z-direction from the top surface toward the bottom surface thereof. Preferably the apertures form channels that extend from the top surface to the bottom surface through the entire thickness of the second layer. In certain instances, the top surface of the second layer may form a portion of the web contacting surface of the papermaking belt.

In a particularly preferred embodiment, the support structure comprises a woven single layer fabric or a multi-layered fabric. Generally multi-layer fabrics comprise a first woven fabric layer for contacting and structuring the nascent web and a second woven fabric layer woven to the first layer and forming the machine contacting side to enhance fabric stability and serve as sacrificial wear elements. Further, the woven first layer may comprise a warp dominant, shute dominant, or coplanar woven fabric. Persons skilled in the art are aware that changing weaving parameters such as weave pattern, mesh, count, or yarn size as well as heat setting conditions can affect which yarns form the highest plane in the fabric.

Preferably the support structure has a web contacting surface having two planes lying in different elevations—a first elevation lying in a first surface plane and a second elevation lying in a second surface plane. Generally, the first elevation, which may be referred to as a peak, lies above the second elevation, which may be referred to as a valley. The first and second elevations may be arranged in a regular repeating fashion such as alternating ridges and valleys. In certain preferred embodiments, the web-contacting surface of the support structure comprises a plurality of valleys, which may be in the form of substantially continuous landing areas, disposed between a plurality of peaks, which may also be substantially continuous. In this manner the web contacting surface may have peaks lying in a first surface plane and having a first elevation which bound valleys lying in a second plane and having a second elevation. Each elevation has a first dimension in a first direction (x) in the plane of the top surface area, a second dimension in a second direction (y) in the plane of the top surface area, the first and second directions (x,y) being at right angles to each other, a mean height and an area as measured in the plane of the top surface area, these dimensions being defined when the fabric is in an uncompressed state.

Figure 1A:
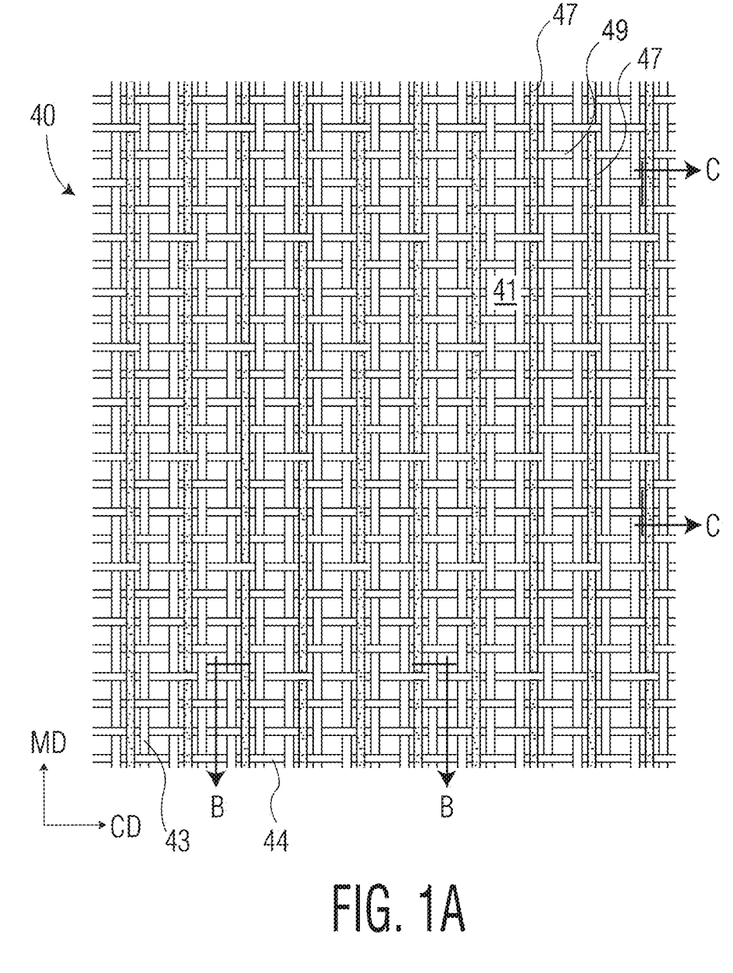
FIG. 1A is a top plan view of a support structure useful in the present invention.
Figure 1B:
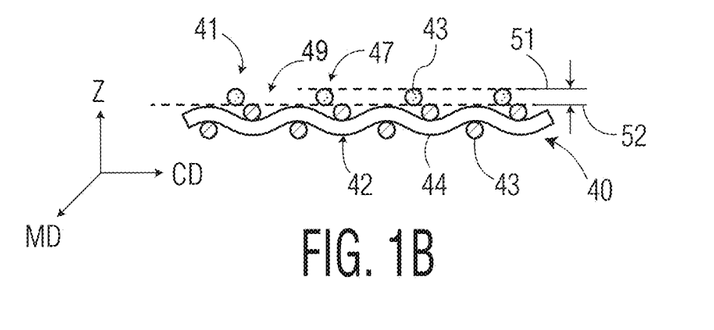
FIG. 1B is a cross-section view of the support structure of FIG. 1A through line B-B.
Figure 1C:
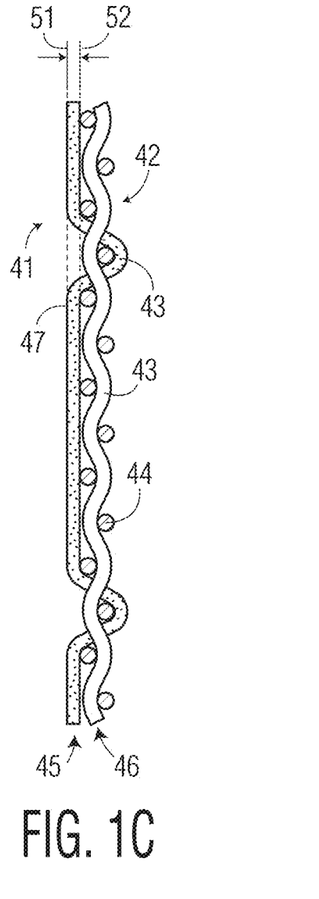
FIG. 1C is a cross-section view of the support structure of FIG. 1A through line C-C.

One support structure for use in the laminated belt of the present invention is illustrated in FIGS. 1A through 1C. The support structure 40 has two opposed surfaces—a web contacting surface 41 and a machine contacting surface 42. The support structure 40 has two principle dimensions—a machine direction ("MD"), which is the direction within the plane of the fabric parallel to the principal direction of travel of the tissue web during manufacture and a cross-machine direction ("CD"), which is generally orthogonal to the machine direction.

In other embodiments, the support structure may comprise a multi-layered coplanar woven fabric, such as that illustrated in FIGS. 1A through 1C. The illustrated support structure 40 comprises woven shute yarns 43 and warp yarns 44. The yarns are woven so as to provide a support structure 40 having two surface planes lying in different elevations—a first surface plane 51 having a first z-direction elevation and a second surface plane 52 having a second z-direction elevation. The illustrated fabric generally comprises two layers 45, 46. The first layer 45 is generally defined by a MD oriented ridge 47 formed by warp yarn 44 which is woven into the plain weave of the second layer 46 to form a ridge 47 (also referred to as a knuckle) that is substantially aligned in the machine direction. The upper surface of the ridge 47 defines the first surface plane 51. Below the first layer 45 the support structure 40 comprises a machine contacting layer 46 which consists of a plain-woven fabric structure having load-bearing warp yarns 44 interwoven with shute yarns 43 in a 1×1 plain weave.

The support structure 40 comprises a plurality of ridges 47 spaced apart from one another in the cross-machine direction (shown in FIG. 1B). In this manner the support structure 40 has a three-dimensional web contacting surface 41 consisting essentially of machine direction ridges 47 and valleys 49 formed by the top surface of the machine contacting layer 42. In the illustrated embodiment, the valleys 49 and ridges 47 are arranged in an alternating fashion and extend throughout the machine direction length of the support structure 40 in a generally parallel fashion.

The elevation difference between the first and second planes may range from about 30 to about 150 percent of the diameter of the warp yarn 44 which is woven into the plain weave of the load-bearing layer second layer 46 to form a ridge 47, and more preferably from about 70 to about 110 percent of the warp yarn 44 diameter. The warp yarn diameters may range from about 0.1 to about 1.5 mm, such as from about 0.25 to about 1.25 mm, such as from about 0.40 to about 1.0 mm. For example, if the warp yarn diameter is 0.3 mm the elevation difference may be 0.25 mm. For non-circular yarns, the strand diameter is deemed to be the vertical dimension of the strand, as it is oriented in the fabric, the strand normally being oriented with its widest dimension parallel to the sublevel plane.

Figure 2:
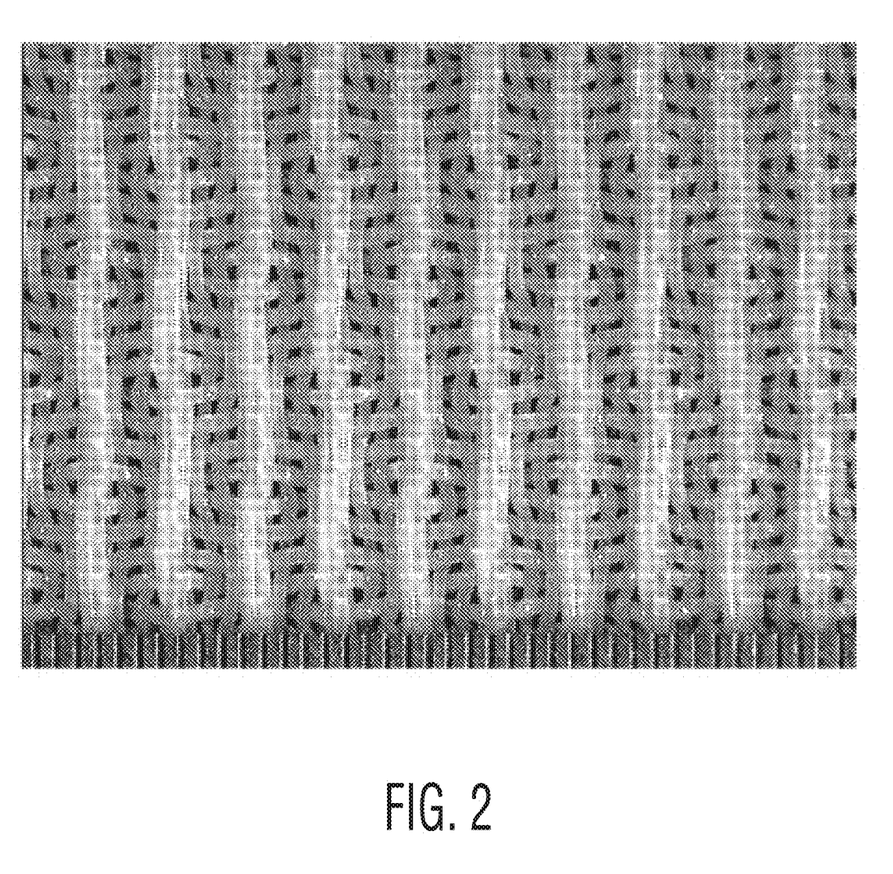
FIG. 2 is a top plan view of another support structure useful in the present invention.

Another support structure useful in the present invention is illustrated in FIG. 2. The illustrated fabric is a multi-layered similar to those disclosed in U.S. Pat. No. 7,300,543, the contents of which are incorporated herein in a manner consistent with the present disclosure. The multi-layered woven support structure may have deep, discontinuous pocket structures with a regular series of distinct, relatively large depressions in the fabric surface surrounded by raised warp or raised shute strands. The pockets could be of any shape, with their upper edges on the pocket sides being relatively even or uneven, but the lowest points of individual pockets are not connected to the lowest points of other pockets. The most common examples are all waffle-like in structure and could be warp dominant, shute dominant, or coplanar.

The multi-layered support structure may be coplanar or shute dominant. For purposes herein, when referring to a fabric, a deep discontinuous pocket structure is a regular series of distinct, relatively large depressions in the surface of the fabric that are surrounded by raised warp or raised shute strands. The general shape of the pocket opening can be any shape. The pocket depth, which is the z-directional distance between the top plane of the fabric and the lowest visible fabric knuckle that the tissue web may contact, can be from about 0.5 to about 8.0 mm, more specifically from about 0.5 to about 5.5 mm, and still more specifically from about 1.0 to about 5.5 mm. Expressed differently, the pocket depth can be from about 250 to about 525 percent of the warp strand diameter. (For purposes herein, a "knuckle" is a structure formed by overlapping warp and shute strands.) The width or length of the pocket opening in the top surface plane (x-y plane) of the fabric can be from about 5 to about 20 mm, more specifically from about 10 to about 15 mm. Stated differently, the area of the pocket opening in the top surface plane of the fabric can be from about 25 to about 400 square mm, more specifically from about 100 to about 225 square mm. The frequency of occurrence of the pockets in the surface of the fabric sheet can be from about 0.8 to about 3.6 pockets per square centimeter of the fabric. The arrangement of the pockets, when viewed in the machine direction of the fabric, can be linear or offset.

In other embodiments the support structure may comprise a single layered woven fabric, such as that disclosed in U.S. Pat. No. 7,611,607, the contents of which are incorporated herein in a manner consistent with the present disclosure. For example, the support structure may comprise a single layered woven fabric having substantially continuous machine direction ridges separated by valleys, the ridges being formed of multiple warp strands grouped together and supported by multiple shute strands of two or more diameters, where the diameters may range from about 0.1 to about 1.5 mm, such as from about 0.25 to about 1.25 mm, such as from about 0.40 to about 1.0 mm. The width of the ridges may be from about 1.0 to about 5.0 mm, more specifically about 1.3 to 3.0 mm, still more specifically 1.9 to 2.4 mm; and the frequency of occurrence of the ridges in the cross-machine direction of the fabric is from about 0.5 to 8 per centimeter, more specifically 3.2 to 7.9 per centimeter, and still more specifically 4.2 to 5.3 per centimeter. The z-directional distance between the first surface plane of the fabric, generally defined by the upper surface of the ridges, and the second surface plane, generally defined by the lowest visible fabric knuckle that the tissue web may contact, can be from about 0.5 to about 3.0 mm, more specifically about 1.0 to about 2.0 mm. For purposes herein, a "knuckle" is a structure formed by overlapping warp and shute yarns. For purposes herein, the lowest visible fabric knuckle becomes the over-1-shute warp knuckle within the fabric valleys.

The support structure is preferably permeable to air and water and includes a series of apertures such as holes that are adapted to allow passage of water and/or air from the web contacting surface into and through the structure to the machine contacting surface. The apertures may vary in size, but in certain embodiments may be greater than 0.05 mm in effective diameter and more preferably greater than about 0.10 mm and still more preferably greater than about 0.20 mm, such as from about 0.05 to about 1.00 mm and more preferably from about 0.20 to about 0.75 mm in effective diameter. While apertures are discussed as holes, the apertures include any number of configurations, and may have any number of cross-sectional shapes such as round, elliptical, oval and rectangular. In certain instances, the apertures may have a substantially continuous cross-sectional shape, while in other instances the cross-sectional shape may vary from the opening disposed on the web contacting surface to the corresponding opening disposed on the machine contacting surface. Further, while the apertures may be disposed on any portion of the support structure, in certain instances it may be desirable to selectively dispose the apertures in the valleys so that they are not obscured when the nonwoven layer is disposed on the ridges and laminated thereto to form the multi-layered fabric of the present invention.

To form the laminated papermaking fabric of the present invention a nonwoven layer is generally laminated to the above described support structure. The nonwoven structure generally forms a portion of the web contacting surface of the multi-layered fabric. Further, the nonwoven layer generally comprises a plurality of apertures which open onto the underlying support structure. In this manner when the nascent web is brought into contact with the web contacting surface of the multi-layered fabric it contacts both the nonwoven layer and a portion of the underlying support structure which is accessible via the apertures disposed on the nonwoven layer. Thus, both the nonwoven layer and the support structure may act on the web.

The nonwoven layer may comprise a thermoplastic resin, a silicone rubber, or a non-silicone vulcanized rubber made from at least a majority by weight of fluoroelastomer having good heat and chemical resistance. Suitable thermoplastic resins which can be employed include, but are not limited to, polyvinyl fluoride, polyvinylidene fluoride, polyvinyl chloride, polyethylene, polypropylene, polyethers, styrene-butadiene copolymers, polybutylenes, and the like. Other suitable thermoplastic film forming polymers include polyethylene ("PE"), polypropylene ("PP"), polyphenylene sulfide ("PPS"), polyimides, polyamides, polysulfones, polysulfides, cellulosic resins, polyarylate acrylics, polyarylsulfones, polyurethanes, epoxies, poly(amide-imides), copolyesters, polyethersulfones, polyetherimides, polyarylethers, and the like. In other instances, the nonwoven layer may comprise a silicone rubber. In still other instances the nonwoven may comprise a fluoroelastomer layer bonded to a silicone rubber layer.

Preferably the nonwoven layer is formed from a material having tear strengths ranging from about 10 to about 50 N/mm with hardness ranging from about 20 to about 75 on the Shore A scale. In other instances, it may be preferable that the nonwoven layer is formed from a material having a Young's Modulus greater than about 0.5 Mpa, such as from about 0.5 to about 6.0 MPa, such as from about 1.0 to about 4.0 MPa. For example, in one embodiment, the nonwoven layer may comprise a single layer of silicone rubber, having a hardness from about 50 to about 70 on the Shore A scale and a modulus from about 2.0 to about 5.0 MPa.

In certain instances, the material used to form the woven layer may be the same material used to form the woven support structure. In other instances, the materials used to form the various layers may be different. For example, in certain embodiments both the nonwoven and woven layers are formed from polyethylene ("PE"), polypropylene ("PP"), polyphenylene sulfide ("PPS"). In other embodiments the woven layer comprises polyethylene ("PE"), polypropylene ("PP") or polyphenylene sulfide ("PPS") yarns and the nonwoven layer comprises a silicone rubber.

The forgoing nonwoven materials facilitate the formation of a belt that is chemical and heat resistant as well as sufficiently mechanically resilient to withstand the rigors of the papermaking process, they also provide the advantage of being well suited for cutting using a wide variety of techniques to form openings of different sizes, shapes, densities and configurations. Examples of suitable cutting techniques include laser engraving, drilling, or cutting or mechanical punching with or without embossing. As will be appreciated by those skilled in the art, such techniques can be used to form large and consistently-sized openings in various patterns, sizes and densities. In fact, openings of most any type (dimensions, shape, sidewall angle, etc.) can be formed in the nonwoven layer using such techniques.

The nonwoven and woven layers may be laminated to one another using laminating techniques well known in the art such as the woven layer and the nonwoven are jointly heated through a preferably coated heating cylinder and are then guided through a cooled nip. In other embodiments a plurality of heating cylinders or other heating methods, such as infrared radiators, may be used. In a preferred embodiment, only the nonwoven layer is heated, such as by direct contact with the surface of a heated cylinder where the temperature of the heated cylinder is selected such that a portion of the nonwoven layer is heated up to the molten state across the wrap distance of the heating cylinder. The molten nonwoven layer is then brought into facing contact with the unheated woven layer and passed through a cool nip to laminate the layers together.

In still other embodiments the nonwoven layer may be laminated onto the woven layer, followed by exposure to infrared (IR) light or radiation. The woven layer may be constructed from an IR non-sensitive polymer resin and the nonwoven layer may comprise an IR absorbent metal layer. IR then passes through the non-infrared absorbent woven layer to cause bonding of the infrared-absorbing nonwoven layer and the non-infrared absorbing woven layer. Apart from infrared light or radiation, a laser may also be used to selectively heat the nonwoven layer and bond it to the woven layer.

In other embodiments the nonwoven layer may be adhered to the support structure with a suitable adhesive. In such embodiments the nonwoven layer may be made of polymer that is compatible with the adhesive. Suitable adhesives include, for example, materials that can be strongly adhered to support structure and are resistant to thermal degradation at typical tissue machine dryer operating conditions and are reasonably flexible, such as silicones, polyesters, polyurethanes, epoxies, polyphenylsulfides and polyetherketones.

The nonwoven can comprise a substantially continuous framework, a substantially semi-continuous framework, a plurality of discrete elements, or any combination thereof. For example, the nonwoven layer may comprise a lattice structure forming a substantially continuous framework. In other embodiments the nonwoven layer comprises semi-continuous framework disposed on the support structure and extending substantially throughout one dimension thereof, and each element in the plurality is spaced apart from adjacent elements. In this manner the elements may span the entire cross-machine direction of the fabric and may endlessly encircle the belt in the machine direction.

The shape of the framework, including the spacing and arrangement of elements within the framework, may vary depending on the desired tissue product properties and appearance. In one embodiment a plurality of linear elements in the form of sinusoidal waves extend continuously throughout one dimension of the belt and each element is spaced apart from the adjacent element. Thus, the elements may be spaced apart across the entire cross-machine direction of the belt, may endlessly encircle the belt in the machine direction, or may run diagonally relative to the machine and cross-machine directions. Of course, the directions of the elements alignments (machine direction, cross-machine direction, or diagonal) discussed above refer to the principal alignment of the elements. Within each alignment, the elements may have segments aligned at other directions, but aggregate to yield the particular alignment of the entire elements.

Figure 3:
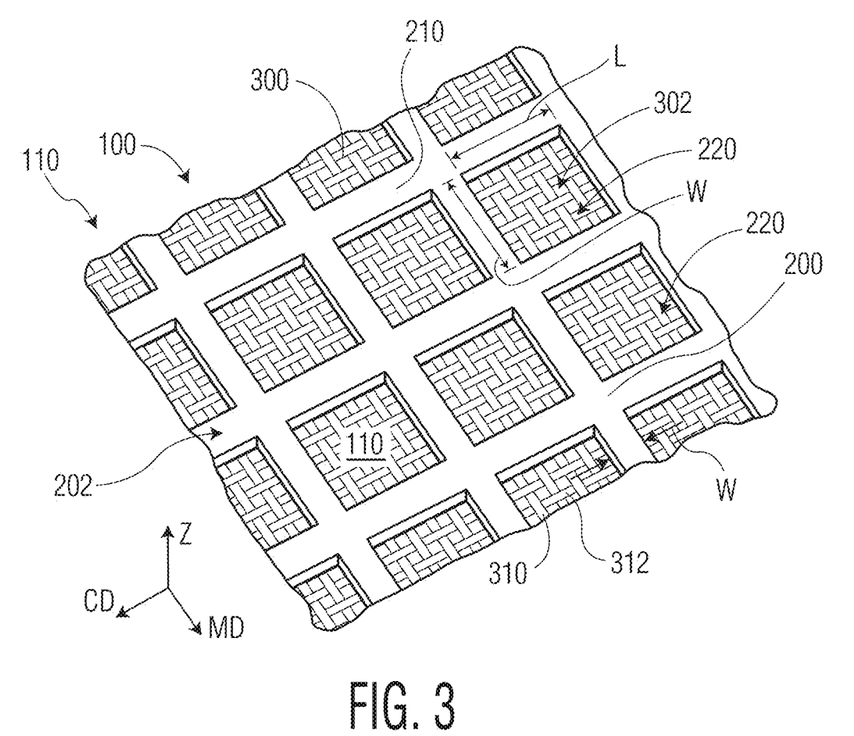
FIG. 3 top plan view of a laminated papermaking belt according to one embodiment of the present invention.
Figure 4:
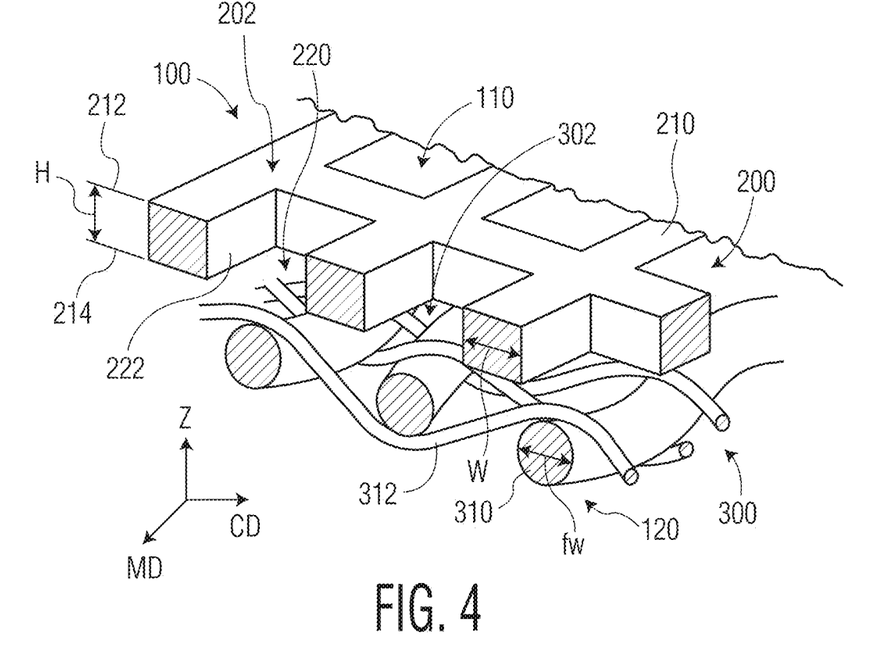
FIG. 4 is a detailed perspective view of the laminated papermaking belt of FIG. 3.

Turning now to FIGS. 3 and 4, one embodiment of a laminated belt according to the present invention is illustrated. The laminated belt 100 comprises a nonwoven layer 200 laminated to a support structure 300, which in the illustrated embodiment is a woven fabric comprising interwoven shute and warp yarns 310, 312. The multi-layered laminate belt 100 has two opposed surfaces—a web contacting surface 110 and a machine contacting surface 120. Further, the fabric has two principle dimensions—a machine direction ("MD") and a cross-machine direction ("CD"). The support structure 300 comprises woven shute yarns 312 and warp yarns 310. The nonwoven layer 200 is laminated to the woven fabric 300 and extends in the z-direction (generally orthogonal to both the machine direction and cross-machine direction) above the plane of the woven fabric 300. In certain preferred embodiments, such as that illustrated in FIGS. 3 and 4, the upper surface 202 of the nonwoven layer 200 is planar.

In the illustrated embodiment the nonwoven layer 200 comprises a lattice grid framework 210 having an upper surface 202 lying in an upper surface plane 212. The upper surface 202 forms a portion of the web contacting surface 110 of the laminated belt 100. The framework 210 forms a continuous lattice grid defining rectangular shaped apertures 220. The apertures 220 open onto the web contacting surface 110 on one surface and are bounded by the support structure 300 on the other. In this manner the apertures 220 open onto and define web contacting portions 302 of the underlying support structure 300. Together the framework 210 and the web contacting portions 302 form the web contacting surface 110 of the laminated belt 100. The nonwoven layer 200 generally has a z-directional thickness, designated as the layer height (H) which is generally measured as the distance between the top and bottom surface planes 212, 214 of the nonwoven layer 200. In certain embodiments the z-directional thickness (H) may range from about 0.10 to about 2.80 mm, such as from about 0.20 to about 2.50 mm, such as from about 0.3 to about 2.0 mm, such as from about 0.50 to about 1.50 mm.

As illustrated in FIG. 4, the nonwoven layer 200 is joined to the woven fabric 300 and extends outwardly from the web contacting surface 302 thereof in the z-direction. The nonwoven layer 200 comprises a plurality of apertures 220 having sidewalls 222. While the sidewalls 222 are illustrated as being substantially straight, the invention is not so limited, and the sidewalls may be straight or tapered and may have thickness dimensions necessary to withstand the temperatures, pressures, and deformations which occur during the papermaking process. As further illustrated in FIGS. 3 and 4, the apertures 220 are similarly sized and have generally straight, parallel sidewalls 222, providing the apertures 220 with a width (W), length (L) and a height, which is generally equal to the z-directional thickness of the nonwoven layer (H). The length (L) and width (W) are measured generally normal to the principal dimension of the aperture 220 within the top plane 212 of the nonwoven layer 200 at a given location.

With continued reference to FIGS. 3 and 4, the framework 210 forms a continuous lattice grid. The framework 210 has a width (W), which is generally the maximum span of framework 210 between adjacent sidewalls 222 measured normal to the machine direction (MD) of the laminated belt 100 along the upper surface plane 212 of the nonwoven layer 200 at a given location. The shute and warp yarns 310, 312 also have a width (fw), which in the illustrated embodiment is generally the diameter of the yarn. In certain instances, the maximum width (W) of the lattice grid framework 210 and the maximum width (fw) of the shute and warp yarns 310, 312 are related to one another. For example, the ratio of W to fw (W:fw) may range from about 0.30:0.10 to about 0.30:1.50, such as from about 0.50:0.10 to about 0.50:1.50. In particularly preferred embodiments the lattice grid framework 210 has a substantially uniform width throughout the framework and ranges from about 0.20 to about 1.00 mm, such as from about 0.40 to about 0.80 mm and more preferably from about 0.40 to about 0.60 mm. The framework is laminated to a woven support structure having yarns with a maximum width from about 0.50 to about 1.50 mm, such as from about 0.60 to about 1.20 mm and more preferably from about 0.70 to about 1.00 mm.

The apertures, which may also be referred to as holes, pass through the nonwoven layer into the support structure. In some embodiments, the apertures extend from the top surface to the bottom surface of the nonwoven layer through the entire thickness of the layer, thereby causing the layer to be permeable to air and/or liquids. The support structure may also be provided with apertures that pass through the entire thickness of the layer and in certain embodiments the apertures of the first and second layers may be registered with one another so as to provide a continuous channel from the web contacting surface of the fabric to the machine contacting surface. The continuous channels allow the passage of either or both air and water through the fabric.

Holes can be formed in the nonwoven layer by, for example, laser drilling or other suitable punching, drilling or cutting operation. For example, the holes may be formed in the nonwoven layer prior to laminating to the support structure by machining or cutting. In other instances, the holes may be formed after the nonwoven layer has been laminated to the support structure by laser drilling that has been configured such that the holes only penetrate the nonwoven layer and not the underlying support structure.

The fibers disposed on the nonwoven layer during the manufacturing process can be drawn into the apertures under the influence of a pressure differential, for example, by a vacuum, or otherwise, for example, by a mechanical pressure. The fibers that have been drawn into the apertures may contact the underlying woven layer. Further, as will be discussed in more detail below, the woven layer lying beneath the aperture in the nonwoven layer may correspond to a woven valley which the fiber may be molded to thereby altering the mechanical properties of the resulting tissue web.

Figure 5A:
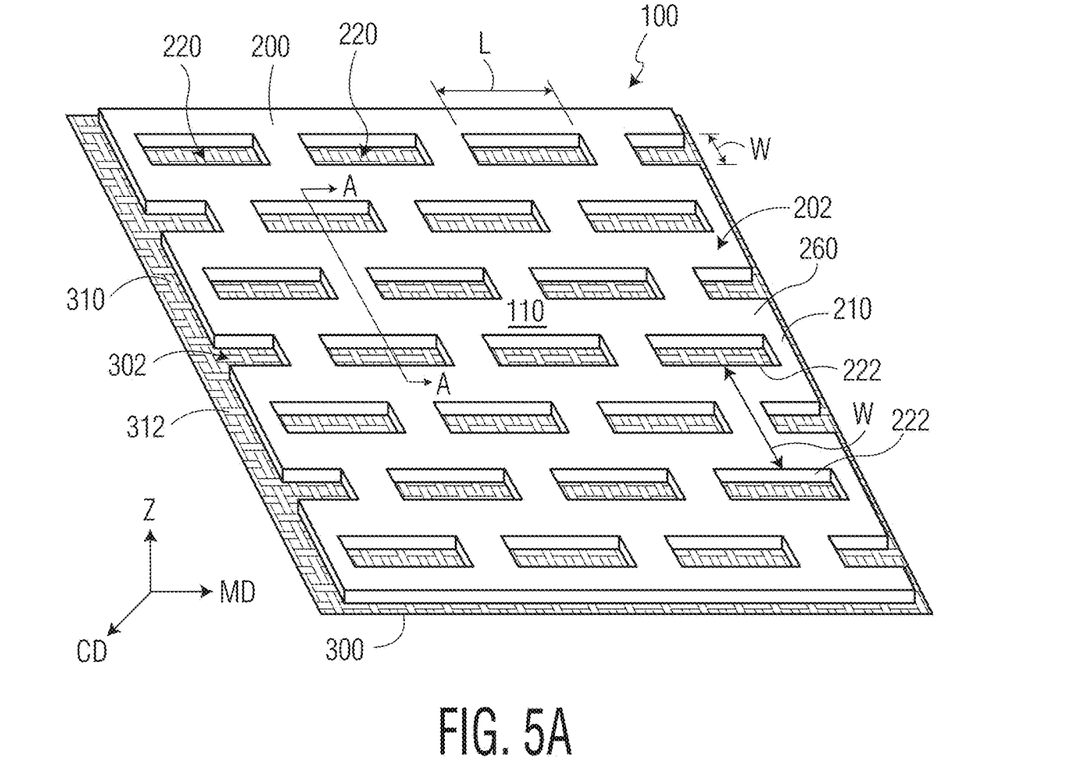
Figure 5B:
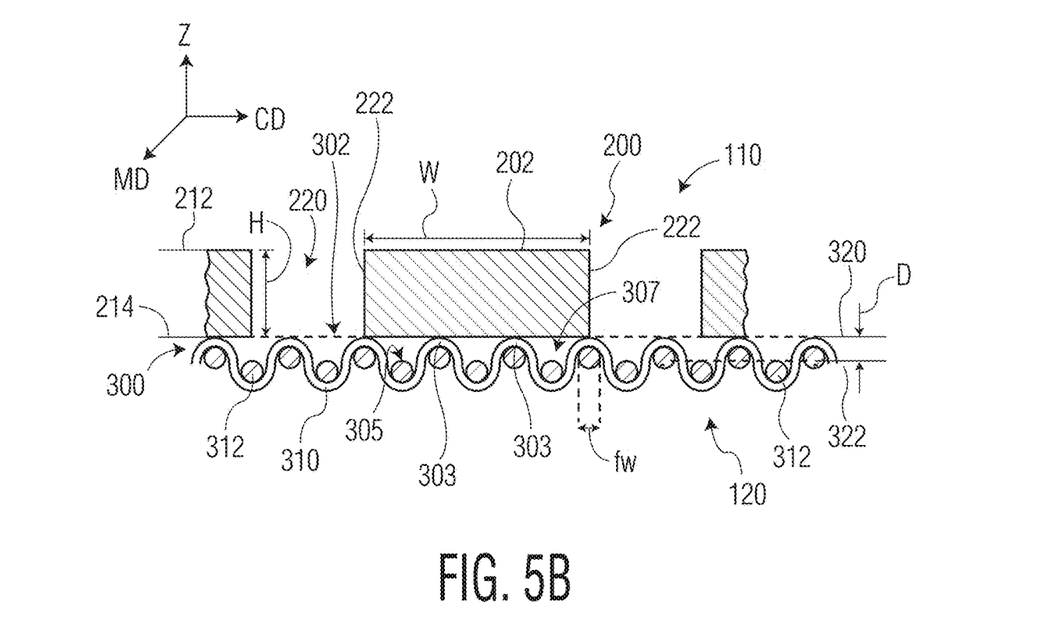
FIG. 5B is a cross-sectional view of the papermaking belt of FIG. 5A through line A-A.

With reference now to FIGS. 5A and 5B, another embodiment of a laminated belt according to the present invention is illustrated. The laminated belt 100 comprises a nonwoven layer 200 laminated to a support structure 300 formed from woven shute and warp yarns 310, 312. The nonwoven layer 200 generally comprises a lattice grid having a planar upper surface 202 and a plurality of rectangular shaped apertures 220 separated from one another by the lattice grid elements 260. The apertures 220 open onto the underlying support structure 300 to define web contacting portions 302 thereof. Together the framework 202 and the web contacting surface 302 of the support structure 300 form the web contacting surface 110 of the laminated belt 100.

The support structure 300 comprises woven shute yarns 310 and warp yarns 312. The yarns are woven so as to provide a woven fabric 300 having two surface planes lying in different elevations—a first surface plane 320 having a first z-direction elevation and a second surface plane 322 having a second z-direction elevation. The fabric 300 comprises a plurality of ridges 303, the upper most portion of which define the first plane 320 of the woven fabric 300. The woven fabric 300 also comprises a plurality of valleys 305 disposed between ridges 303, the upper surface which defines the second plane 322 of the woven fabric 300. In the illustrated embodiment, the ridges 303 and valleys 305 are arranged in an alternating fashion and extend throughout the machine direction (MD) of the fabric 300 in a generally parallel fashion.

When the nonwoven layer 200 and the woven layer 300 are laminated to form the multi-layered laminated belt 100 the layers 200, 300 are brought together in facing relation to one another and at an interface formed between the bottom surface plane 214 of the nonwoven layer 200 and the upper surface plane, also referred to as the first plane 320, of the woven layer 300. In this manner a portion of the nonwoven framework 210 may bridge at least two adjacent ridges 303 creating a void 307. In other instances, a portion of the nonwoven layer 200 may extend beyond a ridge 303 and be cantilevered over a void 307.

In a particularly preferred embodiment, the warps 312 and shute 310 yarns forming the woven layer 300 are not enveloped or otherwise surrounded by the nonwoven layer 200 after lamination. In such embodiments the bottom surface plane 214 of the nonwoven layer 200 does not extend to the second surface plane 322 of the woven layer 300. In certain preferred embodiments the bottom surface plane 214 of the nonwoven layer 200 does not extend beyond the uppermost surface plane 320 of the woven layer 300 such that a distinct boundary is formed between the nonwoven layer 200 and the woven layer 300, which is generally coplanar with the upper surface plane 320 of the woven layer 300.

With continued reference to FIG. 5B, the void 307 formed between the nonwoven and woven layers 200, 300 generally has a height dimension in the z-direction (D) that is the z-direction difference between the upper surface plane 320 and second surface plane 322 of the woven layer 300. The void height (D) may be varied according to the thickness (H) of the nonwoven layer 200 such that D and H are interdependent. For example, the nonwoven layer thickness (H) may be inversely proportional to the void height (D) such that as H increases D decreases.

In certain embodiments H may range from about 0.10 to about 2.80 mm, such as from about 0.20 to about 2.00 mm and more preferably from about 0.50 to about 1.50 mm and D may range from about 0.20 to about 2.90 mm, such as from about 0.40 to about 2.50 mm and more preferably from about 0.50 to about 2.00 mm. In other embodiments the sum of D and H may be from about 0.20 to about 3.00 mm, such as from about 0.40 to about 1.40 mm and more preferably from about 0.60 to about 1.00 mm.

Figure 6A:
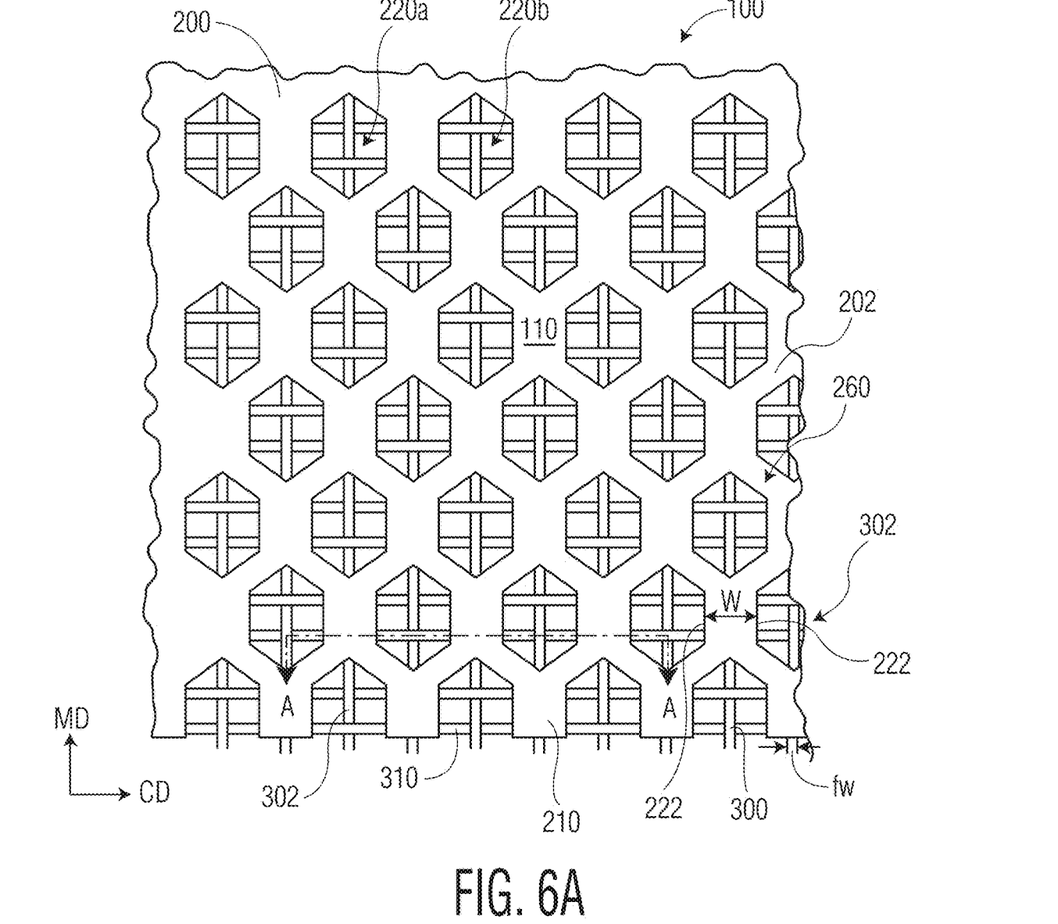
Figure 6B:
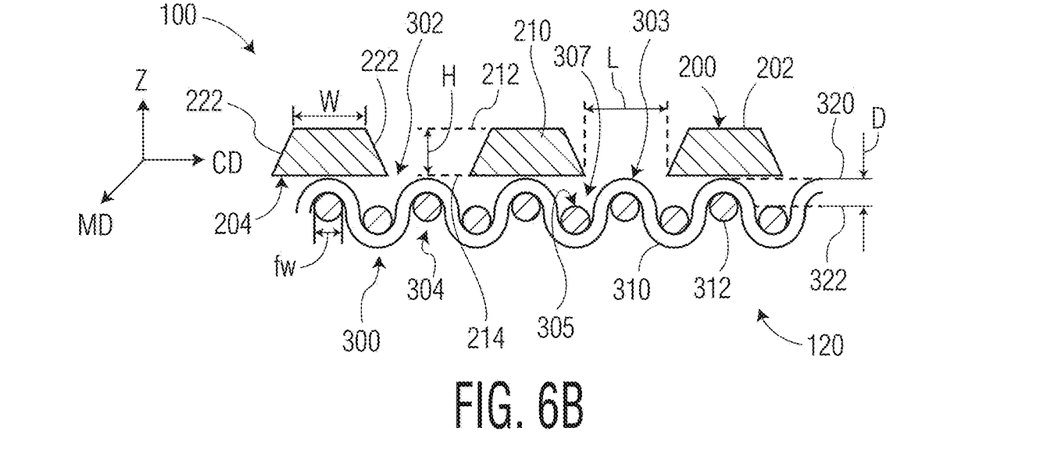
FIG. 6B is a cross-sectional view of the papermaking belt of FIG. 6A through line A-A.

Turning now to FIGS. 6A and 6B another embodiment of a laminated belt 100 according to the present invention is illustrated. While the nonwoven layer 200 is illustrated as being a continuous pattern, the invention is not so limited and the nonwoven layer may form a semi-continuous pattern, discrete protuberances, or a combination thereof. The nonwoven layer 200 generally comprises a plurality of apertures 220 that provide the nonwoven layer 200 with a resulting open area R, which generally refers to the ratio of a cumulative aperture open area (ΣOA) of a given unit of the layer's surface area (A) to that given surface area (A) of this unit, wherein the aperture open area of each individual aperture is formed by the smallest projected open area of a given aperture as measured in a plane parallel to the x-y plane. The specific open area can be expressed as a fraction or as a percentage. For example, in one embodiment, the nonwoven layer may comprise one thousand individual apertures dispersed throughout a unit surface area (A) of ten thousand square millimeters, and each aperture has the projected open area of five square millimeters, the cumulative projected open area (ΣR) of all one thousand apertures dispersed throughout five thousand square millimeters, and the specific resulting open area of such a hypothetical layer is 50 percent. In certain embodiments the nonwoven layer may have an open area greater than about 50 percent and more preferably greater than about 70 percent, such as from about 50 to about 90 percent and still more preferably from about 60 to about 90 percent, such as from about 70 to about 85 percent.

The cumulative projected open area of each individual aperture is measured based on its smallest projected open area parallel to the x-y plane, because some apertures may be non-uniform throughout the thickness of the layer—from the top surface 212 to the bottom surface 214 of the nonwoven layer 200. For example, some apertures may be formed from a framework having tapered sidewalls such that the size of the aperture along the upper surface plane is greater than the size of the aperture along the bottom surface plane.

With continued reference to FIGS. 6A and 6B, the nonwoven layer 200, as illustrated, is a continuous lattice framework 260 having a top surface 202 lying in an upper surface plane 212 and defining a portion of the web contacting surface of the laminated belt 100. The nonwoven layer 200 also has a bottom surface 204 lying in a bottom surface plane 214. The bottom surface 204 generally contacts the woven shute yarns 312 and/or warp yarns 310 forming the woven layer 300. The top and bottom element surfaces 202, 204 are joined by a pair of opposed sidewalls 222 when the layer is viewed in cross-section as shown in FIG. 6B. In this manner, when viewed in cross-section normal to the machine direction (MD), the lattice framework 260 is has a plurality of elements 210 having a height (H) and a width (W). Further, each of the elements 210 have sidewalls 222 that converge towards one another as they extend from the bottom 204 to the top surface 202 providing the elements 210 with a trapezoidal cross-sectional shape.

In certain instances, the elements 210 may have a maximum width (W) greater than about 0.5 mm, such as from about 0.5 to about 3.5 mm, more preferably from about 0.7 to about 1.4 mm, and in a particularly preferred embodiment between from about 0.8 to about 1.0 mm. The width is generally measured normal to the machine direction (MD) of the fabric within the upper surface plane of the nonwoven layer at a given location. Where the element has a generally square or rectangular cross-section, the width (W) is generally measured as the distance between the two planar sidewalls that form the element. In those cases where the element does not have planar sidewalls, the width is measured along the upper surface of the nonwoven layer at the point where the nonwoven layer contacts the woven layer.

In certain instances, the element width may be related to the maximum width of the shute and warp yarns (fw). For example, the ratio of maximum element width (W) to maximum yarn width (fw) may range from about 0.30:0.10 to about 0.30:1.50, such as from about 0.50:0.10 to about 0.50:1.50. In particularly preferred embodiments the nonwoven layer is continuous and comprises elements having a substantially uniform width ranging from about 0.20 to about 1.00 mm, such as from about 0.40 to about 0.80 mm and more preferably from about 0.40 to about 0.60 mm. The foregoing continuous nonwoven layer may be laminated to a woven support structure having yarns with a maximum width from about 0.50 to about 1.50 mm, such as from about 0.60 to about 1.20 mm and more preferably from about 0.70 to about 1.00 mm.

While the elements 210 illustrated in FIG. 6B have a trapezoidal cross-sectional shape, the invention is not so limited, and the elements may have any number of different cross-sectional shapes. For example, in certain embodiments the nonwoven layer may have elements, which viewed in the cross-section, have planar sidewalls and a square cross-sectional shape where the width (W) and height (H) are equal. In such embodiments W and H may vary from about 0.6 to about 3.0 mm, in a particularly preferred embodiment W and H may vary from about 0.7 to about 1.4 mm and still more preferably from about 0.8 to about 1.0 mm.

Figure 7:
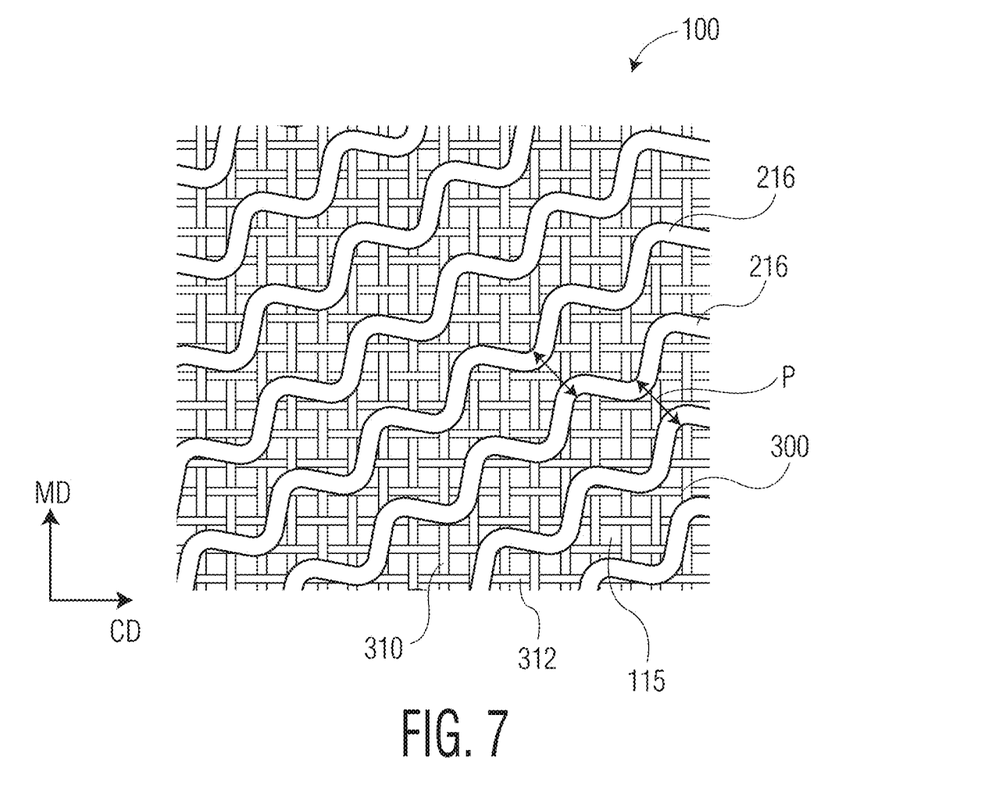
FIG. 7 is a top plan view of a laminated papermaking belt according to still another embodiment of the present invention.

With reference now to FIG. 7, in certain embodiments the nonwoven layer 200 may comprise a plurality of discrete elements 216 laminated to the woven fabric 300. As is the case when nonwoven layers having continuous or semi-continuous patterns are laminated to a support structure according to the present invention, the discrete elements 216 and woven layer 300 are attached to one another at an interface between the bottom surface plane of the discrete elements 216 and the uppermost surface plane of the woven fabric 300. In this manner a void is formed between the nonwoven layer and the woven fabric. Further, laminating the layers in this manner generally prevents the bottom surface plane of the nonwoven layer from extending beyond the uppermost surface plane of the woven layer and as such the warps and yarns forming the woven layer are generally not enveloped or otherwise surrounded by the nonwoven layer. Rather, a distinct boundary is formed between the nonwoven and woven layers, which is generally coplanar with the upper surface plane of the woven layer.

With further reference to FIG. 7, a preferred embodiment illustrating the spacing and arrangement of the discrete elements 216 is illustrated. Generally, none of the elements 216 intersect one another and preferably are arranged parallel to one another. Individual elements may be spaced apart from one another at regular intervals a distance (P), such as from about 1.0 to about 20 mm apart, such as from about 2.0 to about 10 mm apart, and in a particularly preferred embodiment from about 3.0 to about 5.0 mm apart, where the spacing is measured from the center of one element to the center of an adjacent element.

As further illustrated in FIG. 7, the discrete element 216 may occur as wave-like patterns that are arranged in-phase with one another such that P is approximately constant. In other embodiments discrete elements may form a wave pattern where adjacent discrete elements are offset from one another. Regardless of the particular discrete element pattern, or whether adjacent patterns are in or out of phase with one another, the discrete elements are separated from one another by some minimal distance. Preferably the distance between discrete elements is greater than 0.5 mm and more preferably greater than about 1.0 mm and still more preferably greater than about 2.0 mm such as from about 1.0 to about 6.0 mm and still more preferably from about 2.0 to about 5.0 mm.

Preferably a plurality of discrete elements are disposed on the support structure and extend substantially throughout one dimension thereof, and each element in the plurality is spaced apart from adjacent elements. In this manner the discrete elements may span the entire cross-machine direction of the belt and may endlessly encircle the belt in the machine direction.

In those embodiments where the nonwoven layer comprises a plurality of spaced apart discrete elements, the discrete elements may be apertured or the first layer may be substantially devoid of apertures. Regardless, the laminated belt 100 generally comprises landing areas 115, which are bounded by the discrete elements 216. The landing areas 115 allow water to be removed from the web by the application of differential fluid pressure, by evaporative mechanisms, or both, when drying air passes through the web while on the belt 100 or a vacuum is applied through the belt 100. The arrangement of discrete elements 216 and landing areas 115 yield a laminated belt 100 having a three dimensional surface topography.

A laminated papermaking belt 100, such as that illustrated in FIG. 7, comprising a first nonwoven layer 200 consisting essentially of discrete elements 216 and a second woven layer 300 comprising shute and warp yarns 310, 312 woven in a pattern so as to provide two surface planes lying in different z-direction elevations—a first surface plane having a first elevation and a second surface plane having a second elevation—may be manufactured by laminating the discrete elements to a sacrificial layer. The nonwoven elements may be brought into contact with the web contacting surface of the nonwoven layer and laminated thereto. After laminating the nonwoven elements to the woven support structure, the sacrificial material may be removed. In one embodiment the sacrificial layer is removed by mechanical force, such as by peeling or cutting. In other embodiments the sacrificial layer may be removed chemically. Suitable chemical techniques will vary depending upon the composition of the sacrificial material. For example, the sacrificial material may comprise PVOH, which may be removed by spraying water onto the laminated fabric or by immersing the laminated fabric in water. To facilitate its separation from the woven layer, the sacrificial layer is preferably formed of a material that differs in composition from the woven layer. The type of material best suited for the sacrificial layer will depend in part on the technique used to remove the layer, as well as attachment to the nonwoven layer.

The sacrificial layer and discrete nonwoven elements are preferably laminated to the woven layer through the application of sufficient heat and force to cause the woven material to deform and flow. Preferably however, the flow is limited such that the valleys of the woven fabric are not filled and there remains a void between the woven fabric and any material laminated thereto. In this manner the sacrificial material does not penetrate the woven fabric, but instead remains intact and does not completely envelop the yarns forming the woven layer following lamination.

While the invention has been described in detail with respect to the specific aspects thereof, it will be appreciated that those skilled in the art, upon attaining an understanding of the foregoing, may readily conceive of alterations to, variations of, and equivalents to these aspects. Accordingly, the scope of the present invention should be assessed as that of the appended claims and the following embodiments:

First Embodiment

A laminated papermaking belt comprising a woven layer comprising a plurality of woven ridges lying in a first x-y plane and a plurality of woven valleys lying in a second x-y plane, wherein the first plane is above the second plane; and a nonwoven layer comprising a plurality of apertures;

wherein the woven layer and nonwoven layers are laminated to one another in a facing arrangement and wherein there is a void between the woven and nonwoven layers, the void having a void height (D) from about 0.10 to about 2.80 mm.

Second Embodiment

The belt of the first embodiment wherein the nonwoven layer comprises a continuous framework and has an open area from about 50 to about 95 percent and more preferably from about 70 to about 90 percent.

Third Embodiment

The belt of the first or second embodiment wherein the nonwoven layer comprises discrete elements.

Fourth Embodiment

The belt of the any one of the first through third embodiments wherein the nonwoven layer comprises semi-continuous, parallel elements spaced apart from one another from about 2.0 to about 5.0 mm.

Fifth Embodiment

The belt of the any one of the first through fourth embodiments wherein the nonwoven layer has a z-direction thickness (D) from about 0.20 to about 2.90 mm.

Sixth Embodiment

The belt of any one of the first through fifth embodiments wherein the nonwoven layer has a z-direction thickness (D) and the sum of D and H is from about 0.20 to about 3.00 mm.

Seventh Embodiment

The belt of any one of the first through sixth embodiments wherein the nonwoven layer has a top surface that is substantially planar.

Eighth Embodiment

The belt of any one of the first through seventh embodiments wherein the plurality of woven ridges are substantially continuous and oriented in the machine direction (MD) and separated from one another by woven valleys and wherein the z-direction height difference between the first and second x-y planes is from about 1.0 to about 5.0 mm.

Ninth Embodiment

The belt of any one of the first through eighth embodiments wherein the woven layer contacts at least a portion of the plurality of ridges and does not contact the valleys.

Tenth Embodiment

A laminated papermaking belt comprising a plurality of woven yarns forming ridges lying in a first x-y plane valleys lying in a second x-y plane, wherein the first plane is above the second plane; and nonwoven layer consisting of a thermoplastic resin, a silicone rubber, or a fluoroelastomer, the nonwoven layer having a plurality of apertures and a percent open area greater than about 70 percent; wherein the woven yarns and the nonwoven layer are laminated to one another in a facing arrangement and wherein there is a void between the woven yarns and the nonwoven layer, the void having a void height (D) from about 0.10 to about 2.80 mm.

Eleventh Embodiment

The belt of the tenth embodiment wherein the nonwoven layer comprises a continuous framework having a maximum element width from about 0.20 to about 2.0 mm.

Twelfth Embodiment

The belt of the tenth or the eleventh embodiments wherein the nonwoven layer comprises a continuous lattice grid having a substantially uniform width which ranges from about 0.20 to about 1.00 mm Thirteenth Embodiment The belt of any one of the tenth through twelfth embodiments wherein
the nonwoven layer comprises a continuous framework is laminated to a woven layer having yarns with a maximum width from about 0.50 to about 1.50 mm.

Fourteenth Embodiment

The belt of any one of the tenth through thirteenth embodiments wherein the ratio of the nonwoven has a maximum element width (W) and the woven yarns have a maximum yarn width (fw) and the ratio of W to fw ranges from about 0.30:0.10 to about 0.30:1.50.

Fifteenth Embodiment

The belt of any one of the tenth through fourteenth embodiments wherein
nonwoven layer has a z-direction thickness (H) from about 0.20 to about 2.90 mm.

We claim:

1. A laminated papermaking belt having a machine direction and a cross-machine direction, a machine contacting surface and an opposite web contacting surface, the belt comprising:
   a. a woven layer comprising a plurality of yarns interwoven to form a plurality of ridges lying in a first x-y plane and a plurality of valleys lying in a second x-y plane, wherein the first plane is above the second plane and the woven layer forms the machine contacting surface of the belt and wherein the plurality of woven ridges are substantially continuous and oriented in the machine direction (MD) and separated from one another by the valleys; and
   b. a nonwoven layer comprising a plurality of apertures laminated to the woven layer in a facing arrangement and forming the web contacting surface of the belt;
   wherein there is a void between the nonwoven layer and the plurality of valleys, and the void has a void height (D) from 0.10 to 2.80 mm.

2. The belt of claim 1 wherein the nonwoven layer comprises a continuous framework and has an open area from 50 to 90 percent.

3. The belt of claim 1 wherein the nonwoven layer comprises a continuous framework having a maximum element width from 0.20 to 2.0 mm.

4. The belt of claim 3 wherein the continuous framework is a lattice grid having a substantially uniform width throughout framework which ranges from 0.20 to 1.00 mm.

5. The belt of claim 3 wherein the plurality of yarns have a maximum width from 0.50 to 1.50 mm.

6. The belt of claim 5 wherein the ratio of the maximum element width of the continuous framework to the maximum yarn width ranges from 0.30:0.10 to 0.30:1.50.

7. The belt of claim 1 wherein the nonwoven layer has a z-direction thickness (H) from 0.20 to 2.90 mm.

8. The belt of claim 1 wherein the nonwoven layer has a z-direction thickness (H) and the sum of D and H is from 0.20 to 3.00 mm.

9. The belt of claim 1 wherein the web contacting surface of the belt is substantially planar.

10. The belt of claim 1 wherein the woven layer comprises a plurality of woven apertures and at least a portion of the woven apertures are aligned with a portion of the nonwoven apertures to define an aperture that extends continuously in the z-direction through the belt from the web contacting surface to the machine contacting surface.

11. The belt of claim 1 wherein the void height (D) ranges from 0.5 to 2.0 mm.

12. The belt of claim 1 wherein the nonwoven layer contacts at least a portion of the plurality of ridges.

13. The belt of claim 1 wherein the nonwoven layer does not contact the valleys.

14. The belt of claim 1 wherein the woven layer comprises woven together shute and warp strands and wherein the plurality of ridges are formed of multiple warp strands grouped together and supported by multiple shute strands of two or more diameters.

15. The belt of claim 1 wherein the nonwoven layer contacts at least a portion of the plurality of ridges and does not contact the valleys and wherein the void height (D) ranges from 0.5 to 2.0 mm.

* * * * *